US008723130B2

(12) United States Patent
Zhai et al.

(10) Patent No.: US 8,723,130 B2
(45) Date of Patent: May 13, 2014

(54) SINGLE PHOTON-COUNTING IMAGING SYSTEM AND METHOD THEREOF

(75) Inventors: Guangjie Zhai, Beijing (CN); Keming Du, Beijing (CN); Chao Wang, Beijing (CN); Wenkai Yu, Beijing (CN)

(73) Assignee: Center for Space Science And Applied Research, Chinese Academy of Sciences (CN)

( * ) Notice: Subject to any disclaimer, the term of this patent is extended or adjusted under 35 U.S.C. 154(b) by 0 days.

(21) Appl. No.: 14/000,421

(22) PCT Filed: Apr. 23, 2012

(86) PCT No.: PCT/CN2012/074533
§ 371 (c)(1),
(2), (4) Date: Sep. 10, 2013

(87) PCT Pub. No.: WO2012/146156
PCT Pub. Date: Nov. 1, 2012

(65) Prior Publication Data
US 2013/0341487 A1 Dec. 26, 2013

(30) Foreign Application Priority Data

Apr. 25, 2011 (CN) .......................... 2011 1 0103559

(51) Int. Cl.
*G01T 1/00* (2006.01)
(52) U.S. Cl.
USPC .................................................. 250/370.08
(58) Field of Classification Search
USPC ................ 250/336.1, 458.1, 459.1, 370.08
See application file for complete search history.

(56) References Cited

U.S. PATENT DOCUMENTS

| 6,700,108 B2 | 3/2004 | Livingston |
| 2006/0239336 A1 | 10/2006 | Baraniuk et al. |
| 2007/0273784 A1 | 11/2007 | Neil et al. |

FOREIGN PATENT DOCUMENTS

CN 1961568 5/2007

OTHER PUBLICATIONS

Duarte., M. F. et al. Single-Pixel Imaging via Compressive Sampling, IEEE Signal Processing Magazine, Mar. 2008 vol. 25, No. 2 pp. 83-91, ISNN: 1053 5888.
Magalhaes, F. et al. Active Illuminaton Single Pixel Camera Based on Compressive Sensing, Applied Optics Feb. 1, 2011, vol. 50, No. 4, pp. 405-414.

(Continued)

*Primary Examiner* — Mark R Gaworecki
(74) *Attorney, Agent, or Firm* — Jack Schwartz and Associates, PLLC

(57) ABSTRACT

A single-photon counting imaging system and method includes an optical filter, first and second lenses, a digital micro-mirror device (DMD) control system, a single-photon counter and a data processing unit. The DMD and first and second lenses convert two-dimensional image data into a one-dimensional sequence. The ultra-weak light is filtered by the optical filter, after which the ultra-weak light image onto the DMD through the first lens. The DMD controls the probability of the photons reflected to the second lens and the second lens controls focusing of the photons. The data processing unit and single-photon counter complete sparse reconstruction. The data processing unit converts the number of photons counted by the single-photon counter within a certain period of time into the probability of detected photon counts. A photon density image is reconstructed by adopting an optimization algorithm based on the measurement matrix on the DMD and the measured value.

7 Claims, 1 Drawing Sheet

(56) References Cited

OTHER PUBLICATIONS

Figueredo, M. et al. Gradient Projection for Sparse Reconsturction: Application to Compressed Sesnsing and Other Inverse Problems, IEEE Journal of Selected Topics in Signal Processing, Dec. 2007, vol. 1. No. 4, pp. 586-597, ISSN: 1932-4559.

Candes, E. et al. An Introduction to Compressive Sampling, IEEE Signal Processing Magazine, Mar. 2008 vol. 25 No. 2, pp. 21-30 ISSN: 1053 5888.

Wu, Quinglin et al. Single Photon Detection Technology, Progress in Physics, Sep. 2013, vol. No. 3, pp. 296-306, ISSN 1000-0542.

International Search Report for PCT/CN/2012/074533 dated Aug. 6, 2012.

SINGLE PHOTON-COUNTING IMAGING SYSTEM AND METHOD THEREOF

FIELD OF THE INVENTION

The invention relates to the technical field of ultra-weak light detection, in particular to a single-photon counting imaging system and a single-photon counting imaging method. High-quality two-dimensional imaging of an ultra-weak light object can be realized using a point detector by adopting the compressed sensing theory and the digital light processing (DLP) technology.

BACKGROUND OF THE INVENTION

Common imaging device acquires an image by recording the light intensity and the position of a certain point on an observation object. When the light intensity of the observation object is attenuated to a certain extent and reaches a single-photon level, discrete pulse signals are formed. A single photon, as an ultra-weak light, is regarded as the indivisible minimum energy unit of light, the detectable limit as well. The single-photon detection technology is applied in the fields of biological self-illumination, medical diagnosis, non-destructive material analysis, astronomical observation, spectral measurement, quantum optics and the like, and plays an important role therein. Research of ultra-weak light imaging detection technology is very significant for the development of these fields.

Photon counting imaging is an ultra-weak light detection technology. An image is acquired by accumulation and fusion at a data processing end generally through recording photon counting of an imaging position and the probability of detecting photons. The core of the technology is an array detector. The scale (array size), the sensitivity range and the wavelength response range of the array detector directly affect whether the image acquisition quality at single-photon level can be acquired or not. However, the array detector for the single-photon detection level is expensive and can be realized in only a few wave bands, and furthermore it has weak sensitivity, and so there exists the contradiction between technical immaturity and strong demand of two-dimensional imaging of an ultra-weak light object.

The compressed sensing theory (CS theory) was proposed by E. J. Candès et al., which breaks through the traditional linear sampling pattern, and shows that a few measurements of the linear random projection of compressive signals contains enough information for original signal reconstruction.

The CS theory comprises two parts, namely compressive sampling and sparse reconstruction.

The compressive sampling is a process for mapping measured signals from a high dimension to a low dimension. If $x \in R^n$ is the data to be measured, $y \in R^k$ is the observation data, $\Phi \in R^{k \times n}$ is a random projection matrix ($k \ll n$) and $e \in R^k$ is measurement noise, then the compressive sampling process can be described as formula (1):

$$y = \Phi x + e \quad (1)$$

If x is sparse in a transform domain, that is, $\theta = \Psi x$ and $\Psi$ is a sparse transform matrix, formula (1) is transformed into formula (2):

$$y = \Phi \Psi^{-1} \theta + e \quad (2)$$

The random projection matrix $\Phi$ is also referred to as a measurement matrix, and is required to satisfy RIP (Restricted Isometry Property):

$$(1-\delta_s)\|x\|_2^2 \leq \|Ax\|_2^2 \leq (1+\delta_s)\|x\|_2^2$$

wherein $\delta_s$ is defined as the minimum constant that leads to all s-sparse vectors x satisfy the above inequality, and the $\delta_s < 1$.

In addition, the more irrelevant between $\Phi$ and $\Psi$ is, the smaller the value of the measurement times k required by the sampling is, so generally the $\Phi$ is designed as a random matrix.

The sparse reconstruction actually means to solve x in formula (1) under the condition that the observation data Y and the measurement matrix $\Phi$ are known, which is an ill-posed problem and generally solved by using an optimization method and can be described as formula (3):

$$\min_{x \in R^n} \left( \frac{1}{2} \|y - \Phi x\|_2^2 + \tau \|x\|_1 \right) \quad (3)$$

If x is sparse in the transform domain, the reconstruction problem corresponding to formula (2) can be described as formula (4):

$$\min_{x \in R^n} \left( \frac{1}{2} \|y - \Phi x\|_2^2 + \tau \|\Psi x\|_1 \right) \quad (4)$$

In formula (3) and formula (4), the first item is a least-square constraint marked as f(x); the second item is a constraint which describes the sparsity of x; and the sum of the two items is a final target function marked as $\phi(x)$.

The DLP technology was proposed by Texas Instruments (TI) and combined with digital video or graphical signals, in which the micro-mirror and lens system can reflect digital images onto a screen or other surfaces. The core of the technology is a DLP chip, namely digital micro-mirror device (DMD control system for short), which is the most precise optical switch in the world now. The DMD control system comprises a matrix of up to 2 million micro-mirrors installed on a hinge, the size of each micro-mirror is smaller than one fifth of the width of human hair, and each micro-mirror can swing in a certain angle range (generally −12° and +12°), these two states being marked as 0 and 1. The micro-mirrors are driven to jitter at a high speed between 0 and 1 by using pulse width modulation (PWM), so that gray-level modulation can be realized. The DMD control system and related precise electronic elements constitute the so-called DLP technology, and the DLP technology has mature products which are widely applied to products such as projectors.

According to the spirit of "sampling first and reconstructing subsequently", it is possible to convert two-dimensional signals into one-dimensional signals in time sequence and to do the sampling by using a single detector. The point detector has a wider selection range in terms of both detection sensitivity and wavelength range, with the advantage of low cost and so single-photon counting imaging realized by using the point detector becomes an important development tendency of future single-photon level imaging.

SUMMARY OF THE INVENTION

In order to solve the contradiction between the low sensitivity and technical immaturity of the conventional array detector and strong demand of two-dimensional imaging of an ultra-weak light object, the present invention provides a single-photon counting imaging system and a single-photon counting imaging method. Based on the compressed sensing (CS) theory, image signals are randomly transformed into random light intensity signals by adopting the DLP technology, and then counting signals are acquired by using a single-photon counter as a detection element, so that the ultra-weak light object is subjected to two-dimensional imaging by using a point detector.

In order to fulfill the object, the invention provides a single-photon counting imaging system, wherein the single-photon counting imaging system realizes two-dimensional imaging of an ultra-weak light object on single-photon level by adopting the CS theory and the DLP technology and by using a single-photon counter as a detection element. The single-photon counting imaging system comprises a light filter, a first lens 1, a digital micro-mirror device (DMD) control system, a second lens 2, a single-photon counter and a data processing unit, wherein:

the combination of the DMD, the first lens 1 and the second lens 2 is used for converting two-dimensional image data into a one-dimensional data sequence so as to complete compressive sampling of the signals to be measured, i.e., firstly the stray light in an ultra-weak light is filtered by the light filter, and then the ultra-weak light is imaged at the DMD control system through the first lens 1, and the DMD control system controls the probability that photons are reflected to the second lens 2 and the second lens 2 controls the focusing of the photons; and the combination of the data processing unit and the single-photon counter is used to complete sparse reconstruction, and to be more specific, the data processing unit converts the number of the photons counted by the single-photon counter during a certain period of time into the probability of detected photons counts, as the measured value, a photon density image is reconstructed by adopting an optimization algorithm applied to the measured value as well as a measurement matrix on the DMD control system, thereby solving out a two-dimensional image.

As an improvement of the technical solution, a light attenuator is also arranged on the light path from a focusing position of the second lens 2 to the single-photon counter, for attenuating the light to the working range of the single-photon detector. The light attenuator is arranged for preventing saturation caused by over high density of the measured photons and over long gating time of the single-photon counter.

In order to fulfill the other object of the invention, the invention also provides a single-photon counting imaging method. The method realizes two-dimensional imaging of an ultra-weak light object on single-photon level by adopting the CS theory and the DLP technology and using a single-photon counter as a detection element. The method comprises the following steps:

1) compressive sampling;

the compressive sampling is realized together by a DMD control system, a first lens 1 and a second lens 2, for converting two-dimensional image data into a one-dimensional data sequence to complete compressive sampling of measured signals, wherein;

the stray light in the ultra-weak light is filtered by a light filter, after which the ultra-weak light is imaged at the DMD control system through the first lens 1, and the DMD control system controls the probability that the photons are reflected to the second lens 2 and the second lens 2 controls the focusing of the photons; and 2) sparse reconstruction In the sparse reconstruction process, a data processing unit converts the number of the photons counted by a single-photon counter during a certain period of time into the probability of detected photon counts, as the measured value, a photon density image is reconstructed by adopting an optimization algorithm applied to the measured value as well as a measurement matrix on the DMD control system, thereby solving out a two-dimensional image.

As an improvement of the technical solution, the method comprises the following steps:

The compressive sampling is a process for mapping the measured signals from high-dimensional signals to low-dimensional ones:

11) If $x \in R^n$ is the data to be measured, $y \in R^k$ is observation data, $\Phi \in R^{k \times n}$ is a random projection matrix (k<<n) and $e \in R^k$ is measurement noise, then the compressive sampling process can be described as formula (1):

$$y = \Phi x + e \tag{1}$$

If x is sparse in the transform domain, that is, $\theta = \Psi x$ and $\Psi$ is a sparse transform matrix, then formula (1) is transformed into formula (2):

$$y = \Phi \Psi^{-1} \theta + e \tag{2}$$

In the formula, $\Psi$ is a wavelet transform matrix, and $\Phi$ is a Gaussian random matrix;

12) if the value of the measurement times is k, the number of the pixels in the two-dimensional image is n, then the measurement matrix in formula (1) is written as $\Phi\{\Phi_1, \ldots, \Phi_i, \ldots, \Phi_k\}$, wherein $\Phi_i$ is the $i^{th}$ row of $\Phi$. The columns of the two-dimensional images of size $\sqrt{N} \times \sqrt{N}$ are connected end to end to form an n×1 one-dimensional column vector, and corresponding to x in formula (1), each element of the vector x represents the photon density at a corresponding position; in the DMD control system, each micro-mirror has the same resolution and the columns of the micro-mirrors of the DMD control system are connected end to end to form a 1×n one-dimensional row vector, which corresponds to a row in the measurement matrix $\Phi$, wherein each element represents the probability that the photon at a corresponding position is transmitted to the second lens 2.

13) if the measurement period is T and during this period the DMD control system is kept unchanged and the number of the photons detected by the single-photon counter is N, then N/T is equivalent to the inner product value of the photon density image and the random number array $\Phi_i$ on the DMD control system, corresponding to an element $$y_i = \sum_{j=1}^{n} \Phi_{i,j} x_j$$

of the observation vector y in formula (1), wherein $\Phi_{i,j}$ and $x_j$ are the $j^{th}$ elements of $\Phi_i$ and x respectively. According to the measurement matrix, the DMD control system is modified so as to repeat k times of the measurement procedure, thereby the whole observation data y can be obtained.

14) the sparse reconstruction means to solve x in formula (1) under the condition that the observation data y and the measurement matrix $\Phi$ are known, and x is generally solved by using an optimization method and can be described as formula (3):

$$\min_{x \in R^n} \left( \frac{1}{2} \|y - \Phi x\|_2^2 + \tau \|x\|_1 \right) \tag{3}$$

If x is sparse in the transform domain, the reconstruction problem corresponding to formula (2) can be described as formula (4):

$$\min_{x \in R^n} \left( \frac{1}{2} \|y - \Phi x\|_2^2 + \tau \|\Psi x\|_1 \right) \qquad (4)$$

In formula (3) and formula (4), the first item is a least square constraint and is marked as f(x); the second item is a constraint which describes the sparsity of x; and the sum of the two items is a target function and is marked as φ(x).

As a further improvement of the technical solution, the optimization method adopts an iterative wavelets threshold-processing (IWT) algorithm, that is, the estimated value of the next iteration is obtained by performing discrete wavelet transform (DWT) on the estimated value of the current iteration, performing threshold-processing on the transform coefficients and performing inverse DWT;

If the threshold-processing function is described as S(u,v)=sign(u)max{|u|−v,0}, then the algorithm can be descried as:

$$x^{t+1} = \Psi^{-1} \cdot S\left(\Psi\left(x^t - \frac{1}{\alpha}\nabla f(x^t)\right), \frac{\tau}{\alpha}\right)$$

wherein $\alpha = \|\Phi^T \Phi\|_2$.

As another improvement of the technical solution in the present invention, on the light path from the focusing position of the second lens 2 to the single-photon counter, a light attenuator is arranged to attenuate the light to the working range of the single-photon detector.

The invention has the advantages that the imaging problem of high detection sensitivity realized by using point detectors is solved by combining the compressed sensing (CS for short) theory and the digital light processing (DLP for short), with the sensitivity of the detector being on the single-photon level, the resolution being directly relevant to the DMD control system-the DMD control system having a very high resolution at present. The invention can be widely applied in the fields of biological self-illumination, medical diagnosis, non-destructive material analysis, astronomical observation, national defense and military, spectral measurement, quantum electronics and the like.

Based on the compressed sensing (CS) theory, a single-photon point detector used as a detection element, the present invention realizes two-dimensional imaging of ultra-weak light by using a single-photon counter, so the structure of the present invention is simple and its sensitivity can reach single-photon level, moreover its resolution is directly relevant to the DMD control system-the DMD control system having a very high resolution at present, therefore the contradiction between the low sensitivity, small array scale and relatively narrow wavelength range of the detector and strong demand of two-dimensional imaging of ultra-weak light object is solved.

DESCRIPTION OF THE DRAWINGS

FIG. 2 (*b*) shows a random matrix on a DMD control system in one-time measurement, wherein black points represent 0, white points represent 1, and gray points represent intermediate values; FIG. 2 (*c*) shows a reconstructed image of an IWT algorithm, wherein the correlation coefficient Cov between the reconstructed image and the original one is 0.9783, and the signal-to-noise ratio PSNR is 23.95dB; and FIG. 2 (*d*) shows a residual image of the IWT algorithm.

DETAILED DESCRIPTION OF THE EMBODIMENTS

The invention is further illustrated in detail in conjunction with the drawings.

Figure 1:
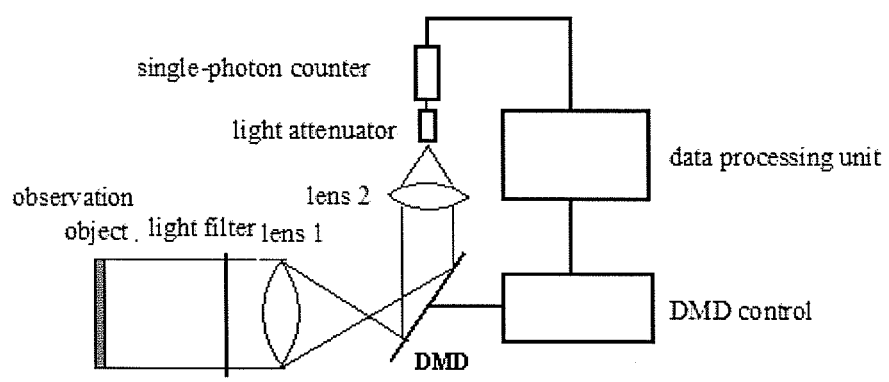
FIG. 1 is a structural schematic diagram of a single-photon counting imaging system of the invention.

As shown in FIG. 1, the stray light in an ultra-weak light emitted by an observation object is filtered by a light filter, after which the ultra-weak light is imaged at a DMD control system through a first lens 1. The DMD control system controls the probability that the photons are reflected to a second lens 2 and the second lens 2 controls the focusing of the photons. A light attenuator is used for attenuating light to the working range of a single-photon detector when the light is over intensive. A single-photon counter counts the number of photons in a certain period of time, and the value of the number obtained can be converted into the probability of detected photons counts and is used as a measured value. Finally a data processing unit reconstructs a photon density image according to the measured value and the measurement matrix on the DMD control system through an optimization algorithm, wherein the light attenuator is designed for preventing saturation caused by over high density of the measured photons and over long gating time of the single-photon counter.

In order to facilitate understanding, supposing the value of the measurement times is k, the measurement matrix in formula (1) is written as $\Phi = \{\Phi_1, \ldots, \Phi_i, \ldots, \Phi_k\}$, wherein $\Phi_i$ is the $i^{th}$ row of Φ. The columns of the two-dimensional image of size $\sqrt{n} \times \sqrt{n}$ are connected end to end to form an n×1 one-dimensional column vector, and corresponding to x in formula (1), each element of the vector represents the photon density at a corresponding position; and in the DMD control system, each micro-mirror has the same resolution and the columns of the DMD control system are also connected end to end to form a 1×n one-dimensional row vector, which corresponds to a row in the measurement matrix Φ, wherein each element represents the probability that the photon at a corresponding position is transmitted to the second lens 2. If the measurement period is T and during this period, the DMD control system is kept unchanged and the number of the photons detected by the single-photon counter is N, then N/T is equivalent to the inner product value of the photon density image and the random number array on the DMD control system, corresponding to an element $$y_i = \sum_{j=1}^n \Phi_{i,j} x_j$$

of the observation vector y in formula (1), wherein $\Phi_{i,j}$ and $x_j$ are the $j^{th}$ elements of $\Phi_i$ and x respectively. According to the measurement matrix, the DMD control system is modified so as to repeat k times of the measurement procedure, thereby the whole observation data y can be obtained, that is to say the process of formula (1) is physically realized.

According to the knowledge of photonics, in an unit area dA, the probability p(r)dA of observing a photon at a point r at any moment is proportional to the light intensity at that point. For illustration, the photon density image is simulated by a gray image of a biochip.

Figure 2:
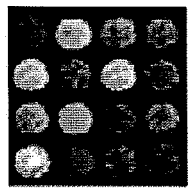
FIG. 2 is a simulation experiment result of the invention, wherein FIG. 2 (*a*) shows an original photon density image.
Figure 2:
Figure 2:
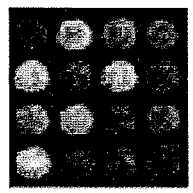
Figure 2:
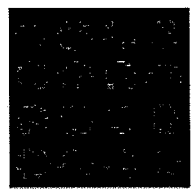

The biochip is a typical ultra-weak light source, and is convenient to be observed by its fluorescent labeling. Actually, all organisms have self-illumination property that contains much important information. The spectrum can be directly observed by adopting the photon counting imaging technology. In an experiment, a biochip image with a resolution of 64×64 is selected, including 256 gray tones, and the highest gray tone corresponding to $4.0×10^2$ $s^{-1}$ photons. The unknown original image can be reconstructed by carrying compressed sampling adopting a Gaussian matrix and an IWT sparse reconstruction algorithm as shown in FIG. 2, wherein (*a*) shows an original photon density image; (*b*) shows a random matrix on a DMD control system in each measurement, black points represent 0, white points represent 1, and gray points represent intermediate values; (*c*) shows the image reconstructed by an IWT algorithm; and (*d*) shows a residual image of the IWT algorithm.

The correlation coefficient Coy between the reconstructed image shown in FIG. 2 (*c*) and the original image of FIG. 2 (*a*) is 0.9783, and the signal-to-noise ratio PSNR is 23.95 dB, which meets the requirement for observing the images of the biochip. Experimental results show that in the invention, the compressed sampling can be realized by hardware, and the image reconstruction can be realized by software.

Finally, it should be understood that the embodiments are only used for illustrating the technical solution of the invention and are not limited. Although the invention is illustrated in detail with reference to the embodiments, it should be understood by those ordinary skilled in the art that modifications or equivalent replacements of the technical solution of the invention not departing from the spirit and scope of the technical solution of the invention should be encompassed in the scope of the claims of the invention.

The invention claimed is:

1. A single-photon counting imaging system, for realizing two-dimensional imaging of an ultra-weak light object at single-photon level by adopting the CS theory and the DLP technology, comprising: a light filter, a first lens, a digital micro-mirror device (DMD) control system, a second lens, a single-photon counter and a data processing unit, wherein the combination of the DMD, the first lens and the second lens is used for converting two-dimensional image data into a one-dimensional data sequence so as to complete compressive sampling of signals to be measured, i.e., firstly the stray light in an ultra-weak light is filtered by the light filter, after which the ultra-weak light is imaged at the DMD control system through the first lens, and the DMD control system controls the probability that photons are reflected to the second lens, and the second lens controls the focusing of the photons; and the combination of the data processing unit and the single-photon counter is used to complete sparse reconstruction, wherein the data processing unit converts the number of the photons counted by the single-photon counter during a certain period of time into the probability of detected photon counts, as the measured value, a photon density image is reconstructed by adopting an optimization algorithm applied to the measured value as well as the measurement matrix on the DMD control system, thereby solving out a two-dimensional image.

2. The single-photon counting imaging system of claim 1, wherein a light attenuator is arranged on the light path from a focusing position of the second lens to the single-photon counter, for attenuating the light to the working range of the single-photon detector.

3. A single-photon counting imaging method, for realizing two-dimensional imaging of an ultra-weak light object at single-photon level by adopting the CS theory and the DLP technology and using a single-photon counter as a detecting element, comprising the following steps:

1) compressive sampling:

the compressive sampling is realized together by a DMD control system, a first lens and a second lens, for converting two-dimensional image data into a one-dimensional data sequence to complete compressive sampling of signals to be measured, wherein the stray light in the ultra-weak light is filtered through a light filter, after which the ultra-weak light is imaged at the DMD control system through the first lens, and the DMD control system controls the probability that the photons are reflected onto the second lens and controls the focusing of the photons; and 2) sparse reconstruction in the sparse reconstruction process, a data processing unit converts the number of the photons counted by the single-photon counter during a certain period of time into the probability of detected photon counts, as measured value, a photon density image is reconstructed by adopting an optimization algorithm applied to the measured value as well as a measurement matrix on the DMD control system, thereby solving out a two-dimensional image.

4. The single-photon counting imaging method of claim 3, comprising the following steps:

the compressive sampling is a process for mapping measured signals from high-dimensional signals into low-dimensional ones:

11) if $x \in R^n$ is the data to be measured, $y \in R^k$ is observation data, $\Phi \in R^{k \times n}$ is a random projection matrix (k <<n) and $e \in R^k$ is measurement noise, then the compressive sampling process can be described as formula:

$$y = \Phi x + e \quad (1)$$

if x is sparse in some fixed basis, that is, $\theta = \Psi x$ where $\Psi$ is a basis, formula can be transformed into formula:

$$y = \Phi \Psi^{-1} \theta + e \quad (2)$$

in the formula, $\Psi$ is a wavelet transform matrix, and $\Phi$ is a Gaussian random matrix;

12) if the value of the measurement times is k, the number of the pixels in the two-dimensional image is n, then the measurement matrix in formula is written as $\Phi = \{\Phi_1, \ldots, \Phi_i, \ldots, \Phi_k\}$, where $\Phi_i$ is the $i^{th}$ row of $\Phi$; the columns of the two-dimensional image of size $\sqrt{n} \times \sqrt{n}$ are connected end to end to form an n×1 one-dimensional column vector, and corresponding to x in formula, each element of the vector x represents the photon density at a corresponding position; in the DMD control system, each micro-mirror has the same resolution and the columns of the micro-mirrors of the DMD are connected end to end to form a 1 ×n one-dimensional row vector, which corresponds to a row in the measurement matrix $\Phi$, wherein each element represents the probability that the photon at a corresponding position is transmitted to the second lens;

13) if the measurement period is T and during this period the DMD control system is kept unchanged and the number of the photons detected by the single-photon counter is N, then N/T is equivalent to the inner product value of the photon density image and the $\Phi_i$ on the DMD control system, corresponding to an element $$y_i = \sum_{j=1}^{n} \Phi_{i,j} x_j$$

of the observation vector y in formula, wherein $\Phi_{i,j}$ and $x_j$ are the $j^{th}$ elements of $\Phi_i$ and x respectively; according to the measurement matrix, the DMD control system is modified so as to repeat k times of the measurement procedure, thereby the whole observation data y can be obtained;

14) the sparse reconstruction means to solve x in formula under the condition that the observed data y and the measurement matrix $\Phi$ are known, and x is solved by using an optimization method and can be described as formula (3):

$$\min_{x \in R^n} \left( \frac{1}{2} \|y - \Phi x\|_2^2 + \tau \|x\|_1 \right) \quad (3)$$

if x is sparse in some fixed basis, so the reconstruction problem of formula (3) can also be described as formula (4):

$$\min \left( \frac{1}{2} \|y - \Phi \Psi^{-1} \vartheta\|_2^2 + \tau \|\Psi^{-1} \vartheta\|_1 \right) \quad (4)$$

in formula (3) and formula (4), the first item is a least-square constraint and is marked as f (x); the second item is a constraint which describes the sparsity of x; and the sum of the two items is a final target function and is marked as φ(x).

5. The single-photon counting imaging method of claim 4, the optimization method adopts an iterative wavelets threshold-processing (IWT) algorithm, that is, the estimated value of the next iteration obtained by performing discrete wavelet transform (DWT) on the estimated value of the current iteration, performing threshold-processing on the wavelet coefficients and performing inverse DWT;

if the threshold-processing function is described as S(u,v) =sign(u)max{|u|−v,0}, then the algorithm can be descried as:

$$x^{t+1} = \Psi^{-1} \cdot S\left( \Psi\left( x^t - \frac{1}{\alpha} \nabla f(x^t) \right), \frac{\tau}{\alpha} \right),$$

wherein $\alpha = \|\Phi^T \Phi\|_2$.

6. The single-photon counting imaging method of claim 4 wherein on the light path from the focusing position of the second lens to the single-photon counter, the light is attenuated to the working range of the single-photon detector by a light attenuator.

7. The single-photon counting imaging method of claim 3, wherein on the light path from the focusing position of the second lens to the single-photon counter, the light is attenuated to the working range of the single-photon detector by a light attenuator.

* * * * *